(12) United States Patent
Lau et al.

(10) Patent No.: US 10,868,335 B2
(45) Date of Patent: Dec. 15, 2020

(54) ELECTROLYTE SALTS FOR RECHARGEABLE MAGNESIUM-ION BATTERIES

(71) Applicant: UCHICAGO ARGONNE, LLC, Chicago, IL (US)

(72) Inventors: Ka-Cheong Lau, Chicago, IL (US); Chen Liao, Westmont, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 154 days.

(21) Appl. No.: 16/133,278

(22) Filed: Sep. 17, 2018

(65) Prior Publication Data
US 2020/0091556 A1 Mar. 19, 2020

(51) Int. Cl.
| | |
|---|---|
| *H01M 10/0568* | (2010.01) |
| *C07F 5/02* | (2006.01) |
| *H01M 10/054* | (2010.01) |
| *H01M 10/0569* | (2010.01) |
| *C07F 5/06* | (2006.01) |

(52) U.S. Cl.
CPC ......... *H01M 10/0568* (2013.01); *C07F 5/022* (2013.01); *C07F 5/069* (2013.01); *H01M 10/054* (2013.01); *H01M 10/0569* (2013.01); *H01M 2300/0028* (2013.01)

(58) Field of Classification Search
CPC ........... H01M 10/0568; H01M 10/054; H01M 10/0569; H01M 2300/0028; C07F 5/022; C07F 5/069; C07F 5/061
USPC ....................................................... 429/324
See application file for complete search history.

(56) References Cited

U.S. PATENT DOCUMENTS

| | | | |
|---|---|---|---|
| 4,564,661 A | 1/1986 | Beresniewicz | |
| 2011/0111286 A1* | 5/2011 | Yamamoto | .......... H01M 10/054 429/188 |

FOREIGN PATENT DOCUMENTS

EP 0483850 B1 8/1995

OTHER PUBLICATIONS

Aurbach, D. et al., On the Mechanisms of Reversible Magnesium Deposition Processes, Journal of the Electrochemical Society 148 (9), A1004-A1014 (2001).
Aurbach, D. et al., Prototype Systems for Rechargeable Magnesium Batteries, Nature 407, 724-727 (2000).
(Continued)

*Primary Examiner* — Gary D Harris
(74) *Attorney, Agent, or Firm* — Olson & Cepuritis, Ltd.

(57) ABSTRACT

Magnesium salts suitable for use in an electrolyte for a magnesium ion electrochemical cell are described herein. The salts are magnesium tetra(perfluoroalkoxy)metalates, optionally solvated with up to seven ether molecules coordinated to the magnesium ion thereof. In one embodiment, the salt has the empirical formula: $Mg(Z)_n{}^{2+}[M(OCR_3)_4{}^-]_2$ (Formula (I)) wherein Z is an ether; n is 0 to about 7; M is Al or B; and each R independently is a perfluoroalkyl group (e.g., $C_1$ to $C_{10}$ perfluoroalkyl). The magnesium salts of Formula (I) are suitable for use as electrolyte salts for magnesium ion batteries (e.g., 5 V class magnesium batteries) and exhibit a wide redox window that is particularly compatible with magnesium anode. The salts are relatively cost effective to prepare by methods described herein, which are conveniently scalable to levels suitable for commercial production.

13 Claims, 7 Drawing Sheets

A

B

B

D

(56) References Cited

OTHER PUBLICATIONS

Aurbach, D. et al., Electrolyte Solutions for Rechargeable Magnesium Batteries Based on Organomagnesium Chloroaluminate Complexes, Journal of the Electrochemical Society 149 (2), A115-A121 (2002).
Beck, W. et al., Metal Complexes of Weakly Coordinating Anions. Precursors of Strong Cationic Organometallic Lewis Acids, Chem. Rev. 88, 1405-1421 (1988).
Bochmann, M., "Non-Coordinating" Anions: Underestimated Ligands, Angew. Chem. Int. Ed. Engl. 31 (9), 1181-1182 (1992).
Canepa, P. et al., Odyssey of Multivalent Cathode Materials: Open Questions and Future Challenges, Chem. Rev. 117, 4287-4341 (2017).
Cermak, J. et al., Dehydration of (Perfluoroalkyl) Tetramethylcyclopentenols, Molecules 16, 4031-4044 (2011).
Chen, Y-X. et al., Cocatalysts for Metal-Catalyzed Olefin Polymerization: Activators, Activation Processes, and Structure-Activity Relationships, Chem. Rev. 100, 1391-1434 (2000).
Dorel, R. et al., Gold(I)-Catalyzed Activation of Alkynes for the Construction of Molecular Complexity, Chem. Rev. 115, 9028-9072 (2015).
Gibson, V.C. et al., Advances in Non-Metallocene Olefin Polymerization Catalysis, Chem. Rev.103, 283-315 (2003).
Hahn, N.T. et al., Enhanced Stability of the Carba-closo-dodecaborate Anion for High-Voltage Battery Electrolytes Through Rational Design, J. Am. Chem. Soc. 140, 11076-11084 (2018).
Herb, J.T. et al., A Fluorinated Alkoxyaluminate Electrolyte for Magnesium-Ion Batteries, ACS Energy Lett. 1, 1227-1232 (2016).
Ittel, S.D. et al., Late-Metal Catalysts for Ethylene Homo-and Copolymerization, Chem. Rev. 100, 1169-1203 (2000).
Jia, L. et al., Cationic Metallocene Polymerization Catalysts Based on Tetrakis(pentafluorophenyl)borate and Its Derivatives. Probing the Limits of Anion "Noncoordination" via a Synthetic, Solution Dynamic, Structural, and Catalytic Olefin Polymerization Study, Organometallics 16, 842-857 (1997).
Johnson, J.A. et al., A New Approach to Non-Coordinating Anions: Lewis Acid Enhancement of Porphyrin Metal Centers in a Zwitterionic Metal-Organic Framework, J. Am. Chem. Soc. 138, 10293-10298 (2016).
Zhao-Karger, Z. et al., A New Class of Non-Corrosive, Highly Efficient Electrolytes for Rechargeable Magnesium Batteries, J. Mater. Chem A. 5, 10815-10820 (2017).
Keyzer, E.N. et al., Mg(PF6)2-Based Electrolyte Systems: Understanding Electrolyte-Electrode Interactions for the Development of Mg-Ion Batteries, J. Am. Chem. Soc. 138, 8682-8685 (2016).
Kim, H.S. et al., Structure and Compatibility of a Magnesium Electrolyte With a Sulphur Cathode, J. Nature Comm. 2, 1-6 (2011).
Kita, F. et al., Electronic Structures and Electrochemical Properties of LiPF6-n(CF3)n, Journal of Power Sources 97-98, 581-583 (2001).
Klare, H.F.T. et al., Silylium Ions in Catalysis, Dalton Trans. 39, 9176-9184 (2010).
Krossing, I. et al., Noncoordinating Anions—Fact or Fiction? A Survey of Likely Candidates, Angew. Chem. Int. Ed. 43, 2066-2090 (2004).
Lee, V.Y. et al., Organosilicon Compounds, Silicon-Centered Cations, Academic Press: Oxford vol. 1, 197-230 (2017).
Liao, C. et al., The Unexpected Discovery of the Mg(HMDS)2/MgCl2 Complex as a Magnesium Electrolyte for Rechargeable Magnesium Batteries, J. Mater. Chem. A 3, 6082-6087 (2015).
Lichtenthaler, M.R. et al., Univalent Gallium Salts of Weakly Coordinating Anions: Effective Initiators/Catalysts for the Synthesis of Highly Reactive Polyisobutylene, Organometallics 32, 6725-6735 (2013).
Lu, Z et al., On the Electrochemical Behavior of Magnesium Electrodes in Polar Aprotic Electrolyte Solutions, Journal of Electroanalytical Chemistry 466, 203-217 (1999).
Matsui, M. et al., Study on Electrochemically Deposited Mg Metal, Journal of Power Sources 196, 7048-7055 (2011).
McArthur, S.G. et al., Cation Reduction and Comproportionation as Novel Strategies to Produce High Voltage, Halide Free, Carborane Based Electrolytes for Rechargeable Mg Batteries, Inorg. Chem. Front 2, 1101-1104 (2015).
McKnight, A.L. et al., Group 4 Ansa-Cyclopentadienyl-Amido Catalysts for Olefin Polymerization, Chem. Rev. 98, 2587-2598 (1998).
Mizrahi, O. et al., Electrolyte Solutions With a Wide Electrochemical Window for Rechargeable Magnesium Batteries, Journal of the Electrochemical Society 155 (2), A103-A109 (2008).
Mohtadi, R. et al., Magnesium Borohydride: From Hydrogen Storage to Magnesium Battery, Angew. Chem. Int. Ed 51, 9780-9783 (2012).
Muldoon, J. et al., Corrosion of Magnesium Electrolytes: Chlorides—The Culprit, Energy Environ. Sci., 6, 482-487 (2013).
Muldoon, J. et al., Electrolyte Roadblocks to a Magnesium Rechargeable Battery, Energy Environ. Sci. 5, 5941-5950 (2012).
Muldoon, J. et al., Fervent Hype Behind Magnesium Batteries: An Open Call to Synthetic Chemists—Electrolytes and Cathodes Needed, Angew Chem. Int. Ed. 56, 12064-12084 (2017).
Nitta, N. et al., Li-Ion Battery Materials: Present and Future, Materials Today 18 (5), 252-264 (2015).
Pour, N. et al., Structural Analysis of Electrolyte Solutions for Rechargeable Mg Batteries by Stereoscopic Means and DFT Calculations, J. Am. Chem. Soc. 133, 6270-6278 (2011).
Rajput, N. N. et al., The Coupling Between Stability and Ion Pair Formation in Magnesium Electrolytes From First-Principles Quantum Mechanics and Classical Molecular Dynamics, J. Am. Chem. Soc. 137, 3411-3420 (2015).
Reed, C.A., Carboranes: A New Class of Weakly Coordinating Anions for Strong Electrophiles, Oxidants, and Superacids, Accounts of Chemical Research 31 (3), 133-139 (1998).
Rohde, M. et al., Li[B(OCH2CF3)4]: Synthesis, Characterization and Electrochemical Application as a Conducting Salt for LiSB Batteries, ChemPhysChem 16, 666-675 (2015).
Rupp, A.B. et al., Ionic Liquids with Weakly Coordinating [MIII(ORF)4]—Anions, Acc. Chem. Res. 48, 2537-2546 (2015).
Sa, N. et al., Concentration Dependent Electrochemical Properties and Structural Analysis of a Simple Magnesium Electrolyte: Magnesium bis(trifluoromethane sulfonyl)imide in Diglyme, RSC Adv. 6, 113663-113670 (2016).
Sarazin, Y. et al., Discrete Cationic Complexes for Ring-Opening Polymerization Catalysis of Cyclic Esters and Epoxides, Chem. Rev. 115, 3564-3614 (2015).
Schulz, A. et al., "Tamed" Silylium Ions: Versatile in Catalysis, Angew. Chem. Int. Ed. 51, 4526-4528 (2012).
Shterenberg, I. et al., Hexafluorophosphate-Based Solutions for Mg Batteries and the Importance of Chlorides, Langmuir 33, 9472-9478 (2017).
Song, J. et al., Mapping the Challenges of Magnesium Battery, J. Phys. Chem. Lett. 7, 1736-1749 (2016).
Tutusaus, O. et al., an Efficient Halogen-Free Electrolyte for Use in Rechargeable Magnesium Batteries, Angew. Chem. Int. Ed. 54, 7900-7904 (2015).
Lie, M. et al., Electrochemical Properties of Quaternary Ammonium Salts for Electrochemical Capacitors, J. Electrochem. Soc. 144 (8), 2684-2688 (1997).
Vestfried, Y. et al.,. Structural Analysis of Electrolyte Solutions Comprising Magnesium-Aluminate Chloro-Organic Complexes by Raman Spectroscopy, Organometallics 26, 3130-3137 (2007).
Wan, Le et al., Mg Desolvation and Intercalation Mechanism at the Mo6S8 Chevrel Phase Surface, Chem. Mater. 27, 5932-5940 (2015).
Wang, Y-M. et al., Development of Catalysts and Ligands for Enantioselective Gold Catalysis, Accounts of Chemical Research 47 (3), 889-901 (2014).
Xu, W. et al., LiBOB and Its Derivatives, Weakly Coordinating Anions, and the Exceptional Conductivity of Their Nonaqueous Solutions, Electrochemical and Solid-State Letters 4 (1), E1-E4 (2001).
Xu, W. et al., A Fusible Orthoborate Lithium Salt with High Conductivity in Solutions, Electrochemical and Solid-State Letters 3 (8), 366-368 (2000).

(56) References Cited

OTHER PUBLICATIONS

Yoo, H.D. et al., Mg Rechargeable Batteries: An On-going Challenge, Energy Environ. Sci. 6, 2265-2279 (2013).
Zhong, M. et al., B(SCN)4-:A New Weakly Coordinating Anion in the Tetracyanoborate Family, J. Phys. Chem. C 122, 13371-13375 (2018).
Zhou, J. et al., Synthesis, Structures, and Reactivity of Weakly Coordinating Anions with Delocalized Borate Structure: The Assessment of Anion Effects in Metallocene Polymerization Catalysts, J. Am. Chem. Soc. 123, 223-237 (2001).

* cited by examiner

A

B

B

D

A

B

ELECTROLYTE SALTS FOR RECHARGEABLE MAGNESIUM-ION BATTERIES

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

This invention relates to materials for use in electrolytes for energy storage devices, notably magnesium ion electrochemical cells and batteries. More particularly, the invention relates to perfluoroalkoxy borate and aluminate magnesium salts, as well as to electrolytes, magnesium ion cells, and batteries comprising the salts.

BACKGROUND

Rechargeable batteries are increasingly used for a variety of energy storage applications. While, lithium ion (Li-ion) batteries remain a very important commercial and research focus, there is an increasing need for new battery technologies to provide better cycling and less capacity loss than the Li-ion.

With regard to the growing environmental crisis resulting from rapid worldwide energy consumption, energy harvested from sustainable renewable sources like solar, wind, or tide is desirable. However, the lack of efficient and economical energy storage devices is still a bottle neck for the practical application of these clean energies. Albeit the great success of lithium-ion batteries (LIBs) in the field of portable electronic applications, the cost and safety barriers make the state-of-the-art LIBs not suitable for large power storage or transmission.

One promising approach to an alternative to Li-ion batteries is a battery based on a multivalent ion electrolyte, such as magnesium (Mg) or calcium (Ca). Li-ion, with a charge of +1, can provide only a single electron for an electrical current, whereas multivalent ions (e.g., with a charge of +2 or +3) have the potential to provide two or more the electrical current of Li-ions (depending on the charge of the multivalent ion) if present with the same density. Calcium ion and magnesium ion provide relatively high potentials ($Ca^{2+}$: −2.87 relative to standard hydrogen electrode, SHE; $Mg^{2+}$: −2.37 vs. SHE) suitable for many secondary battery requirements. Mg batteries are one of the attractive technological alternatives due to low cost and high abundance of Mg, approximately 2 to 5-folds higher theoretical volumetric capacity of anodes (Mg: 3832 $mAh/cm^3$ vs Li: 2061 $mAh/cm^3$ vs graphite: 777 $mAh/cm^3$) and higher safety associated with non-pyrophoric or dendrite-free Mg metal.

Interest in advanced secondary magnesium ion batteries blossomed with the introduction of the Mg—$Mo_6S_8$ battery. Chevrel phase $Mo_6S_8$ has been a reliable cathode material with long-term cycling performance in rechargeable magnesium ion batteries. However, $Mo_6S_8$ only has a theoretical capacity of around 130 mAh $g^{-1}$, and can only operate at less than 1.3 V (vs Mg), which is not desirable for high density energy storage. Traditional transition metal oxide-based cathode materials for lithium ion batteries show intercalation difficulty of the divalent and high charge density $Mg^{2+}$ ions. Redox active organic cathodes also have been reported for magnesium ion batteries in the literature. A common issue for many organic cathodes is that either they can only deliver low capacity even at very slow current rates, or they suffer from considerable capacity loss upon cycling. Redox-active anthraquinone-based polymers comprising 1,4-polyanthraquinone and 2,6-polyanthraquinone reportedly are efficient cathode materials for rechargeable Mg-ion batteries.

While, magnesium is attractive for its potential to achieve a rechargeable battery, so far, reversible Mg plating has been achieved with only a narrow class of electrolytes, i.e., inorganic or organic magnesium aluminum chloride salts dissolved in ethereal solutions. For example, the Mg analogues to the most common commercial Li-ion electrolytes instantaneously decompose and passivate the Mg metal anode surface preventing further electrochemical reaction, consequently blocking the battery. The pursuit for a thermodynamically stable Mg electrolyte across a wide enough electrochemical window has been daunting. For example, $LiBH_4/Mg(BH_4)_2$, or $[\{(THF)_3MgCl\}_2\text{-}\mu\text{-}Cl]^+$ $[MCl_mR'_{4-m}]^-$ (M=Al, Mg; R'=alkyl, aryl, HMDS, where HMDS=$N\{Si(CH_3)_3\}_2^-$), generated from mixtures of Grignard reagents, or $Mg(HMDS)_2$, with $AlCl_mR'_{4-m}$ or $MgCl_2$ in THF, contain electron-rich anions that are cathodically stable (unreactive toward Mg) and enable reversible Mg electrodeposition and dissolution on Mg metal anodes. However, these electron-rich anions are anodically stable only up to 3.3 V on inert electrodes such as Pt, or 2.2 V on stainless steel which is ubiquitously found in batteries due to Cl-promoted corrosion. Further improvement of anodic stability was achieved through the use of less electron-rich anions such as $[B\{OCH(CF_3)\}_4]^-$, $[Al\{OCH(CF_3)\}_4]^-$, and $[CB_{11}H_{12}]^-$. $Mg(CB_{11}H_{12})_2$ is the current state of the art, with excellent cathodic stability as demonstrated in highly reversible Mg electrodeposition and dissolution as well as anodic stability of the electrolyte in glymes of up to 3.8 V and 4.6 V in sulfolane, yet the oxidation of $[CB_{11}H_{12}]^-$ leads to passivation of electrodes. Thus far, these cathodically stable electrolytes are practically limited to electrochemical windows of <4.6 V.

On the other end of the spectrum for electrochemical stability, compounds consisting of electron-deficient anions such as $Mg(TFSI)_2$, $Mg(PF_6)_2$, $Mg(BF_4)_2$, $Mg(ClO_4)_2$ have demonstrated superior anodic stability but these anions also strongly coordinate to $Mg^{2+}$ to form $[Mg^{2+}L^-]^+$ ion-pairs ($L^-$=monoanionic ligands). This coordination to Lewis acidic $Mg^{2+}$ cations also provides a catalytic decomposition pathway for anions through metal-centered reduction of $[Mg^{2+}L^-]^+$ to $[Mg^+L^-]$, and charge transfer from the HOMO of $Mg^+$ to the LUMO of $L^-$ to regenerate $Mg^{2+}$ and reduce $L^-$. The reduced species usually forms a passivation layer that prohibits successive Mg electrodeposition and dissolution. Thus far, no electrolytes have truly wide enough electrochemical windows (>5 V) with both cathodic and anodic stability. Researches on developing thermodynamically stable electrolytes across large electrochemical windows are actively ongoing, but to little avail.

There is an ongoing need for improvements in all aspects of magnesium battery technology, and particularly for new electrolyte materials. The magnesium salts, methods, electrolytes, cells, and batteries described herein address this need.

SUMMARY

Magnesium salts suitable for use in an electrolyte for a magnesium ion electrochemical cell are described herein. The salts are magnesium tetrakis(perfluoroalkoxy)metalates, optionally solvated with up to seven ether molecules coordinated to the magnesium ion thereof. In one embodiment, the salt has the empirical formula: $Mg(Z)_n^{2+}[M(OCR_3)_4^-]_2$ (Formula (I)) wherein Z is an ether; n is 0 to about 7; M is Al or B; and each R independently is a perfluoroalkyl group (e.g., $C_1$ to $C_{10}$ perfluoroalkyl). The magnesium salts of Formula (I) are suitable for use as electrolyte salts for magnesium ion batteries (e.g., 5 V class magnesium batteries) and exhibit a wide redox window that is particularly compatible with magnesium anode. The salts are relatively cost effective to prepare by methods described herein, which are conveniently scalable to levels suitable for commercial production.

The following specific embodiments are enumerated below in order to illustrate certain features and aspects of the salts, electrolytes, cells, batteries, and methods described herein.

Embodiment 1 is a salt of Formula (I): $Mg(Z)_n^{2+}[M(OCR_3)_4^-]_2$, wherein Z is an ether; n is 0 to 7; M is Al or B; and each R independently is a perfluoroalkyl group.

Embodiment 2 comprises the salt of Embodiment 1, wherein Z comprises at least one ether selected from the group consisting of a dialkyl ether and a cyclic ether.

Embodiment 3 comprises the salt of Embodiment 1 or 2, wherein Z comprises at least one ether selected from the group consisting of diethyl ether and tetrahydrofuran.

Embodiment 4 comprises the salt of any one of Embodiments 1 to 3, wherein n is 7.

Embodiment 5 comprises the salt of any one of Embodiments 1 to 4, wherein M is Al.

Embodiment 6 comprises the salt of any one of Embodiments 1 to 5, wherein M is B.

Embodiment 7 comprises the salt of any one of Embodiments 1 to 6, wherein each R independently is a $C_1$ to $C_{10}$ perfluoroalkyl (e.g., $C_1$ to $C_8$ perfluoroalkyl, $C_1$ to $C_6$ perfluoroalkyl, $C_1$ to $C_4$ perfluoroalkyl, or $C_1$ to $C_2$ perfluoroalkyl).

Embodiment 8 comprises the salt of any one of Embodiments 1 to 7, wherein each R is trifluoromethyl.

Embodiment 9 comprises the salt of any one of Embodiments 1 to 8, wherein M is Al, and each R is trifluoromethyl.

Embodiment 10 comprises the salt of any one of Embodiments 1 to 9, wherein M is Al, each R is trifluoromethyl, and Z is selected from the group consisting of diethyl ether ($Et_2O$) and tetrahydrofuran.

Embodiment 11 comprises the salt of any one of Embodiments 1 to 10, wherein M is Al, each R is trifluoromethyl, Z is tetrahydrofuran (THF), and n is 7.

Embodiment 12 is a method of preparing a salt of Formula (I): $Mg(Z)_n^{2+}[M(OCR_3)_4^-]_2$, comprising the steps of:

(a) contacting a lithium metal hydride of formula $LiMH_4$ with at least four molar equivalents of a tertiary alcohol of formula $HOCR_3$ in a hydrocarbon solvent to form a lithium salt of formula $LiM(OCR_3)_4$;

(b) contacting the salt of formula $LiM(OCR_3)_4$ with gaseous hydrochloric acid in a nonaqueous solvent comprising diethyl ether to afford a compound of formula $H(O(CH_2CH_3)_2)_2M(OCR_3)_4$; and (c) contacting the a compound of formula $H(O(CH_2CH_3)_2)_2M(OCR_3)_4$ with a magnesium salt in an ether solvent to afford the salt of Formula (I);

wherein Z is an ether; n is 0 to 7; M is Al or B; and each R independently is a perfluoroalkyl group.

Embodiment 13 comprises the method of Embodiment 12, wherein the ether solvent comprises a mixture of diethyl ether and tetrahydrofuran, and the magnesium salt is magnesium bis(hexamethyldisilazide).

Embodiment 14 comprises the method of Embodiment 12 or 13, wherein each perfluoroalkyl group independently is a $C_1$ to $C_{10}$ perfluoroalkyl group, M is Al, the ether solvent comprises a mixture of diethyl ether and tetrahydrofuran, and the magnesium salt is magnesium bis(hexamethyldisilazide).

Embodiment 15 comprises the method of any one of Embodiments 12 to 14, wherein n is 7, and each R is trifluoromethyl.

Embodiment 16 is an electrolyte comprising the salt of any one of Embodiments 1 to 12 dissolved in a nonaqueous organic solvent.

Embodiment 17 comprises the electrolyte of Embodiment 16, wherein the nonaqueous organic solvent comprises at least one solvent selected from the group consisting of diethyl ether, tetrahydrofuran, 2-methyltetrahydrofuran, 2,5-dimethyltetrahydrofuran, dimethoxyethane, diglyme, triglyme, tetraglyme, sulfolane, 3-methylsulfolane, acetonitrile, propylene carbonate, butyrolactone, valerolactone, and glutaronitrile.

Embodiment 18 is a magnesium electrochemical cell comprising an anode; a cathode; and a magnesium ion-containing electrolyte of Embodiment 16 contacting the anode and the cathode.

Embodiment 19. comprises the electrochemical cell of Embodiment 18 wherein the anode comprises metallic magnesium and the cathode comprises at least one compound selected from the group consisting of $MoS_2$, $Mo_6S_8$, $MoO_3$, $TiS_2$, $Ti_2S_4$, $V_2O_5$, $MnO_2$, $MgM^a_2O_4$, $MgM^bXO_4$, $Mg_{0.5}M^c_2(PO_4)_3$, and $Mg_xM^d(CN)_6 \cdot yH_2O$; wherein: $M^a$ is one or more metal selected from the group consisting of Mn, Fe, Co, Ni, and Cr; $M^b$ is one or more metal selected from the group consisting of Fe, Mn, Co, and Ni; $M^c$ is one or more metal selected from the group consisting of Ti, Zr, V, and Fe; $M^d$ is one or more metal selected from the group consisting of Fe and Ni; X is one or more element selected from the group consisting of Si, P, and S; x is 0 or 1; and y is in the range of 0 to 9.

Embodiment 20 is a battery comprising a plurality of the electrochemical cells of Embodiment 18 electrically connected together.

A salt of Formula (I), namely $Mg(THF)_7[Al(OC(CF_3)_3)_4]_2$, was prepared and the electrochemical properties thereof were evaluated. Reaction of lithium aluminum hydride with perfluoro-tert-butanol ("PFTB"; about 4 equiv.) formed a lithium salt of formula $LiAl(OC(CF_3)_3)_4$. The lithium salt was then reacted with hydrochloric acid in a nonaqueous solvent an containing diethyl ether to afford a compound of formula $H(Et_2O)_2[Al(OC(CF_3)_3)_4]_2$ ("H$(Et_2O)_2[AlPFTB_4]_2$") with lithium chloride as a byproduct. The $H(Et_2O)_2[AlPFTB_4]_2$ was then reacted with magnesium bis(hexamethyldisilazide) ("$Mg(HMDS)_2$") in $Et_2O$/THF solvent to afford a salt of formula $Mg(THF)_7[Al(OC(CF_3)_3)_4]_2$ (also referred to herein as $Mg(THF)_7[AlPFTB_4]_2$, or simply "$Mg(AlPFTB_4)_2$" when referring to the salt without regard to the presence or absence of ether solvation). As described elsewhere herein, $Mg(AlPFTB_4)_2$ is soluble in THF, and is thermally stable below about 240° C. $Mg(AlPFTB_4)_2$ also is electrochemically stable when cycled with a magnesium electrode, and is surprisingly oxidatively stable up to about 5.4 V versus Mg, which is a significant improvement over state of the art magnesium electrolyte materials.

DETAILED DESCRIPTION

Figure 1:
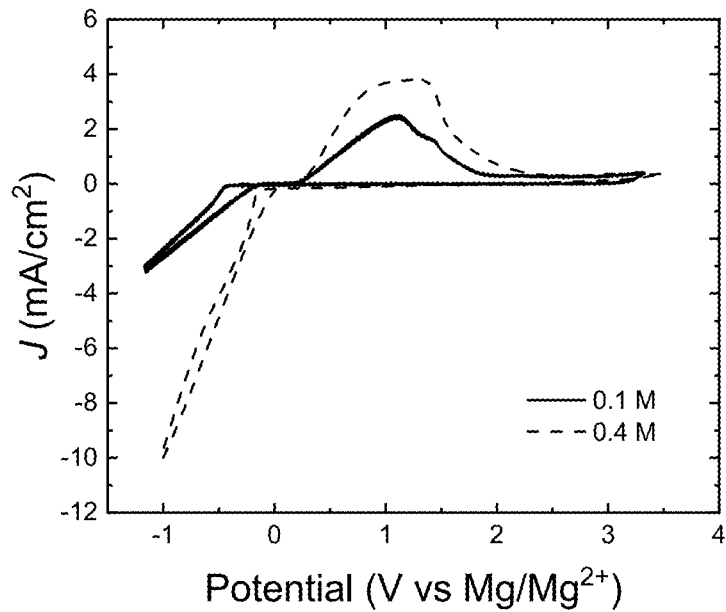
FIG. 1 provides plots of current density (J, mA/cm²) versus potential (relative to Mg/Mg$^{2+}$) demonstrating cathodic stability of Mg(AlPFTB$_4$)$_2$ in triglyme (0.1 M: solid line; 0.4 M: dashed line) versus magnesium anode at first cycle of cyclic voltammetry; working electrode (WE): Pt; counter electrode (CE): Mg; reference electrode: Ag+/AgCl; 100 mV/s.

An expansion of electrochemical window is needed to enable high-voltage (>5 V) Mg batteries that adopt Mg metal anodes in order to potentially replace Li-ion batteries. Fundamentally, chemical intuition suggests that installing electron-withdrawing groups into anions would enhance the oxidative stability by lowering the HOMO level of anions, but this would compromise reductive stability by lowering LUMO, hence hampering most synthetic attempts to expand the electrochemical window. Hypothetically, instead of pursuing thermodynamic stability of anions at both cathodic (low voltage) and anodic (high voltage) ends, kinetic inertness toward Mg can be introduced to thermodynamically and anodically stable anions by leveraging weak coordination to Mg$^{2+}$ to shut down the key step in Mg$^{2+}$-catalyzed reductive decomposition. Weakly coordinating anions have been widely used in catalysis, polymerization and recently in development of electrolytes in batteries to stabilize highly electrophilic, "naked" metal cations, which infer higher catalytic activities to molecular transition metal catalysts, faster intercalation/de-intercalation kinetics and solubility to cations in electrolytes. However, to the best of our knowledge, this concept has never been extended to kinetic inertness of anions for the expansion of electrochemical windows. Therefore, as a proof of concept, a highly electron-deficient, weakly coordinating anion tetrakis(perfluoro-tert-butoxy)aluminate ([TPFA]$^-$=[Al{OC(CF$_3$)$_3$}$_4$]$^-$) was prepared and electrochemically evaluated. The synthesis, characterization and electrochemical performances of perfluorinated magnesium tetra(alkoxy)aluminate Mg[TPFA]$_2$ are described herein.

As described herein, magnesium salts suitable for use in an electrolyte for a magnesium ion electrochemical cell are magnesium tetra(perfluoroalkoxy)metalates, of Formula (I): Mg(Z)$_n^{2+}$[M(OCR$_3$)$_4^-$]$_2$, wherein Z is an ether; n is 0 to about 7; M is Al or B; and each R independently is a perfluoroalkyl group. In some preferred embodiments, M is aluminum.

In some embodiments of Formula (I), each R independently is a $C_1$ to $C_{10}$ perfluoroalkyl group, e.g., a $C_1$ to $C_8$ perfluoroalkyl group, a $C_1$ to $C_8$ perfluoroalkyl group, a $C_1$ to $C_6$ perfluoroalkyl group, a $C_1$ to $C_4$ perfluoroalkyl group, or a $C_1$ to $C_2$ perfluoroalkyl group. The perfluoroalkyl groups can be linear or branched. Non-limiting examples of such perfluoroalkyl groups include trifluoromethyl, pentafluoroethyl, heptafluoro-1-propyl, heptafluoro-2-propyl, nonafluoro-1-butyl, nonafluoro-sec-butyl, nonafluoro-tert-butyl, undecafluorohexyl, pentadecafluorooctyl, and the like. In some preferred embodiments the perfluoroalkyl groups are independently selected from the group consisting of trifluoromethyl and pentafluoroethyl.

The ether, Z, in Formula (I) preferably is at least one ether selected from the group consisting of diethyl ether, tetrahydrofuran, 2-methyltetrahydrofuran, 2,5-dimethyltetrahydrofuran, dimethoxyethane, diglyme, triglyme, and tetraglyme. In some preferred embodiments, the ether, Z, is selected from the group consisting of tetrahydrofuran, diethyl ether, and a combination thereof.

The salts of Formula (I) can be utilized in an electrolyte for a magnesium electrochemical cell, in which the salt is dissolved in a non-aqueous organic solvent, such as at least one solvent, which can be, e.g., an ether, a sulfolane compound, a nitrile, a carbonate, a lactone, or a combination of two or more thereof. In some preferred embodiments the solvent comprises at least one material selected from the group consisting of diethyl ether, tetrahydrofuran, 2-methyltetrahydrofuran, 2,5-dimethyltetrahydrofuran, dimethoxyethane, diglyme, triglyme, tetraglyme, sulfolane, 3-methylsulfolane, acetonitrile, propylene carbonate, butyrolactone, valerolactone, and glutaronitrile. In an electrochemical cell, the electrolyte is in contact with an anode (e.g., metallic Mg) and a cathode, preferably with a porous magnesium permeable membrane situated between the anode and the cathode to prevent direct contract of the anode with the cathode. The cathode can be any cathode material suitable for use in a magnesium electrochemical cell or battery. For example, the cathode can comprise at least one compound selected from the group consisting of MoS$_2$, Mo$_6$S$_8$, MoO$_3$, TiS$_2$, Ti$_2$S$_4$, V$_2$O$_5$, MnO$_2$, MgM$^a{}_2$O$_4$, MgM$^b$XO$_4$, Mg$_{0.5}$M$^c{}_2$(PO$_4$)$_3$, and Mg$_x$M$^d$(CN)$_6$•yH$_2$O; wherein: M$^a$ is one or more metal selected from the group consisting of Mn, Fe, Co, Ni, and Cr; M$^b$ is one or more metal selected from the group consisting of Fe, Mn, Co, and Ni; M$^c$ is one or more metal selected from the group consisting of Ti, Zr, V, and Fe; $M^d$ is one or more metal selected from the group consisting of Fe and Ni; X is one or more element selected from the group consisting of Si, P, and S; x is 0 or 1; and y is in the range of 0 to 9.

Salts of Formula (I) can be prepared by (a) contacting a lithium metal hydride of formula $LiMH_4$ with at least four molar equivalents of a tertiary alcohol of formula $HOCR_3$ in a hydrocarbon solvent to form a lithium salt of formula $LiM(OCR_3)_4$; (b) contacting the salt of formula $LiM(OCR_3)_4$ with gaseous hydrochloric acid in a nonaqueous solvent comprising diethyl ether to afford a compound of formula $H(O(CH_2CH_3)_2)_2M(OCR_3)_4$; and (c) contacting the compound of formula $H(O(CH_2CH_3)_2)_2M(OCR_3)_4$ with a magnesium salt in an ether solvent to afford the salt of Formula (I); wherein Z is an ether; n is 0 to 7; M is Al or B; and each R independently is a perfluoroalkyl group. Non-limiting examples of magnesium salts for use in step (c) include, e.g., magnesium bis(hexamethyldisilazide), dibutylmagnesium, dimethylmagnesium, diphenylmagnesium, and the like.

The magnesium salts of Formula (I) are suitable for use as electrolyte salts for magnesium ion batteries (e.g., 5 V class magnesium batteries) and exhibit a wide redox window that is particularly compatible with magnesium anode. The salts are relatively cost effective to prepare by methods described herein, which are conveniently scalable to levels suitable for commercial production.

The following non-limiting examples are provided to illustrate certain features and characteristics of the compositions and methods described herein.

EXAMPLE 1

Synthesis of $Mg[AlPFTB_4]_2$.

$Mg[AlPFTB_4]_2$ was synthesized in three steps (Scheme 1). The lithium analog $Li[AlPFTB_4]$ was first synthesized from alcoholysis of $LiAlH_4$ by $(CF_3)_3COH$ in a substantially quantitative yield. $Li^+/H^+$ cation metathesis of $Li[AlPFTB_4]$ with HCl in $CH_2Cl_2$ and $Et_2O$ afforded $[H(Et_2O)_2]$ $[AlPFTB_4]$ in 93% yield. Finally, protonolysis of $Mg(HMDS)_2$ by about 2 equivalents (equiv) of $[H(Et_2O)_2]$ $[AlPFTB_4]$ in THF and subsequent recrystallization from diffusion of $Et_2O$ to the THF solution yielded the THF adduct $Mg[AlFTB_4]_2 \cdot 7$ THF in 96% yield. The recrystallized compound was characterized by IR and NMR spectroscopy, and the purity and stoichiometry were supported by elemental analysis and $^1H$ NMR analysis using ferrocene as an internal standard.

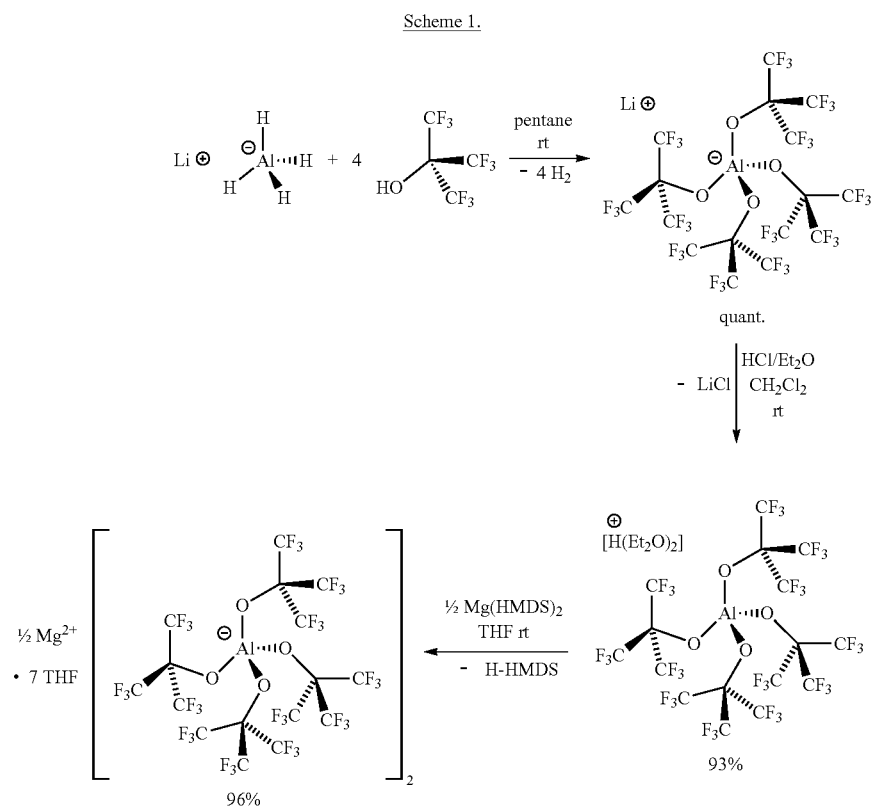

Scheme 1.

Exchange of hydrogen for magnesium was accomplished by combining about 1 equiv $[H(Et_2O)_2][AlPFTB_4]$ (1.06 g, 0.95 mmol) and 0.52 eqiuv $Mg(HMDS)_2$ (168 mg, 0.49 mmol) in a 20 mL scintillation vial, and adding THF (5 mL) to the mixture (resulting in a concentration of about 200 mg $[H(Et_2O)_2][AlPFTB_4]/1$ mL THF). After about 5 min, a clear solution was formed. Recrystallization by diffusion of $Et_2O$ into the THF solution (v/v=1/1) afforded colorless crystals. The crystals were collected, washed with minimal amount of $Et_2O$ by filtration and dried at 100 mTorr at room temperature for about 2.5 h to afford $Mg[AlPFTB_4]_2 \cdot 7$ THF as a white solid (1.10 g, 0.46 mmol, 96%). The $Mg(AlPFTB_4)_2$ is soluble in THF, and is thermally stable below about 240° C. $Mg(AlPFTB_4)_2$ also is electrochemically stable when cycled with a magnesium electrode, and is oxidatively stable up to about 5.4 V versus Mg.

EXAMPLE 2

Electrochemical Physical Property Evaluation of $Mg[AlPFTB_4]_2$.

Figure 2:
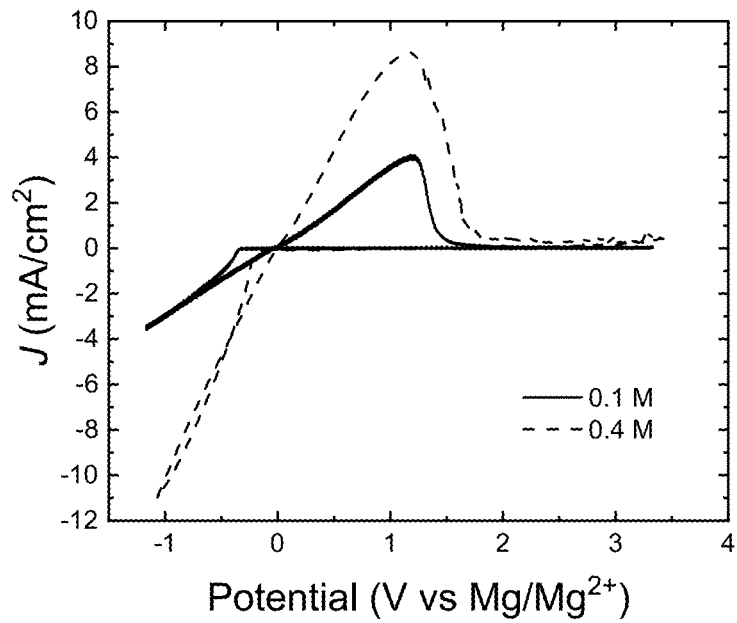
FIG. 2 provides plots of current density (J, mA/cm$^2$) versus potential (relative to Mg/Mg$^{2+}$) demonstrating cathodic stability of Mg(AlPFTB$_4$)$_2$ in triglyme (0.1 M: solid line; 0.4 M: dashed line) versus magnesium anode at 10th cycle; working electrode (WE): Pt; counter electrode (CE): Mg; reference electrode: Ag/AgCl; 100 mV/s.
Figure 3:
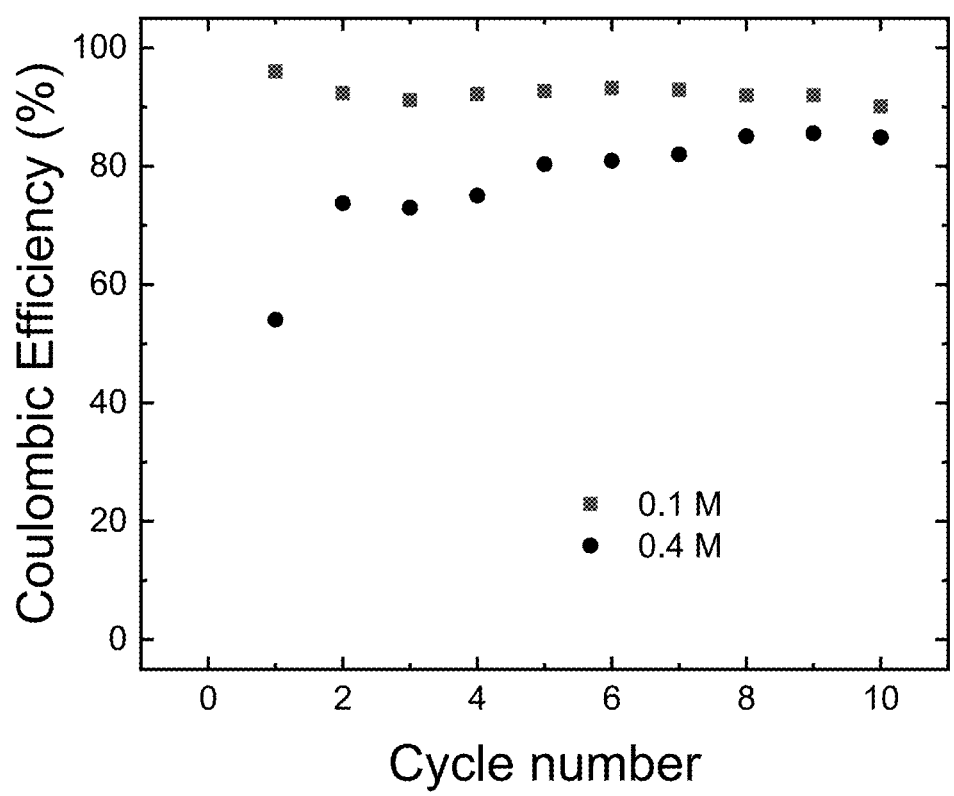
FIG. 3 provides plots of coulombic efficiency versus cycle number in cyclic voltammetry demonstrating cathodic stability of Mg(AlPFTB$_4$)$_2$ in triglyme (0.1 M: square; 0.4 M: circle) versus magnesium anode; working electrode (WE): Pt; counter electrode (CE): Mg; reference electrode: Ag/AgCl; 100 mV/s.

$Mg[AlPFTB_4]_2$ was evaluated by cyclic voltammetry (CV). FIG. 1 provides plots of current density (J) versus potential (relative to $Mg/Mg^{2+}$) demonstrating cathodic stability of $Mg(AlPFTB_4)_2$ in triglyme (0.1 M: solid line; 0.4 M: dashed line) versus magnesium anode at first cycle of cyclic voltammetry; working electrode (WE): Pt; counter electrode (CE): Mg; reference electrode: Ag/AgCl; 100 mV/s, while FIG. 2 provides plots of current density (J) versus potential (relative to $Mg/Mg^{2+}$) demonstrating cathodic stability of $Mg(AlPFTB_4)_2$ in triglyme (0.1 M: solid; 0.4 M: dash) versus magnesium anode at 10th cycle; working electrode (WE): Pt; counter electrode (CE): Mg; reference electrode: Ag/AgCl; 100 mV/s. FIG. 3 provides plots of coulombic efficiency versus cycle number in cyclic voltammetry demonstrating cathodic stability of $Mg(AlPFTB_4)_2$ in triglyme (0.1 M: square; 0.4 M: circle) versus magnesium anode; working electrode (WE): Pt; counter electrode (CE): Mg; reference electrode: Ag/AgCl; 100 mV/s.

Electrodeposition and dissolution of Mg was clearly observed during cycling. The nucleation overpotential, defined as the potential at which electrodeposition begins in the cathodic sweep, was 370 mV in the first cycle, while the dissolution overpotential, defined as the onset potential of the dissolution of deposited Mg into the solution, was 260 mV in the first cycle (FIG. 1). These values improved to 270 mV and 60 mV, respectively, at the 10th cycle and remained approximately constant thereafter (FIG. 2). These observed improvements suggest that a conditioning process occurred during the first 10 cycles. The coulombic efficiency for the first cycle was 96% and decreased slightly to 90% at 10th cycle (FIG. 3). Nonetheless, these results show that the 0.1 M solution of $Mg(AlPFTB_4)_2$ in triglyme possesses sufficient cathodic stability for supporting electrodeposition/ dissolution of Mg.

At a higher concentration of 0.4 M in triglyme, where the formation of $[Mg(AlPFTB_4)]^+$ ion-pairs was strongly implied by IR and NMR spectroscopy, Mg deposition/ dissolution was also observed, but the electrochemical behavior of this solution was drastically different from that of a 0.1 M solution. The nucleation overpotential started and stayed at 260 mV throughout cycling, in sharp contrast with that of 0.1 M solution (see above), and dissolution overpotential started at 170 mV in the first cycle but dropped to 25 mV at the end of $10^{th}$ cycle. The constant and lower nucleation overpotential observed for a more concentrated electrolyte argues against desorption of adsorbed $Mg_x[AlPFTB_4]_y^{n-/n-}$ species, which has been attributed to the higher initial overpotential and impedance as reported for other electrolytes stored at open-circuit potential before cycling as the origin of conditioning of Pt electrode observed for the 0.1 M solution. The coulombic efficiency (CE) of the first cycle was 54%, which was significantly lower than that with 0.1 M solution, and increased to 85% after 10 cycles. These observations are consistent with more favored formation of an SEI on the Pt electrode at a higher concentration, leading to decreased overpotentials. Similar concentration-dependent effects on coulombic efficiency have reported for $Mg(TFSI)_2$ in diglyme and attributed to ion-pairing, and recently noted for $Mg[B\{OCH(CF_3)_2\}_4]_2$ without explanation. All this information and data collectively suggest increased reductive decomposition of the electrolyte, which resulted in an initially lower CE with a higher concentration of $[Mg][TPFA]_2$. The decomposed products could form an SEI on the working electrode, which conditioned the Pt electrode and led to lower overpotentials to avoid further decomposition as in Li-ion batteries.

Figure 4:
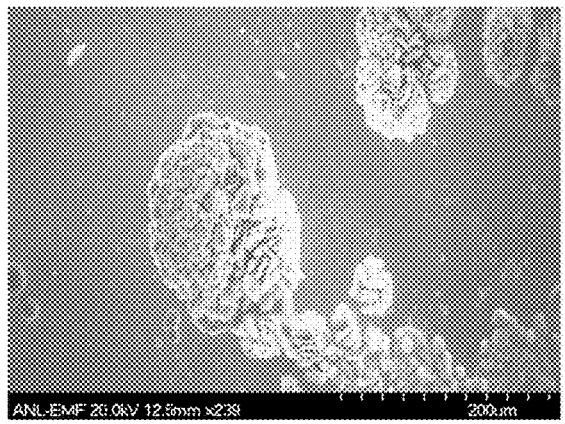
FIG. 4 shows a scanning electron micrograph (SEM) of Mg deposits on Pt from galvanostatic deposition of Mg(AlPFTB$_4$)$_2$ in triglyme for 2.5 h at a current density of 1.5 mA/cm$^2$; WE: Pt; CE: Mg; reference electrode: Ag/AgCl; Panel A shows 239×magnification for deposits from 0.1 M solution. Panel B shows 1000×magnification for deposits from 0.1 M solution. Panel C shows 250×magnification for deposits from 0.4 M solution. Panel D shows 1000×magnification for deposits from 0.4 M solution.
Figure 4:
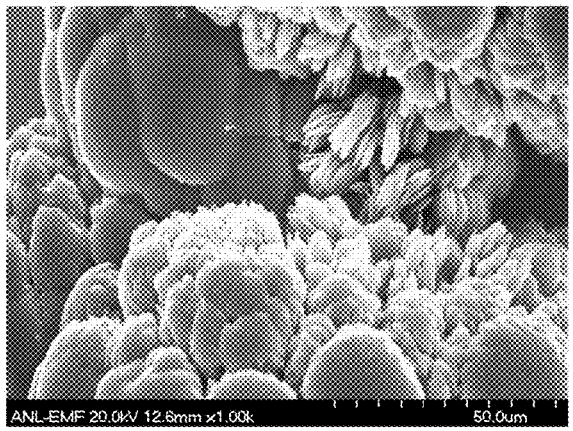
Figure 4:
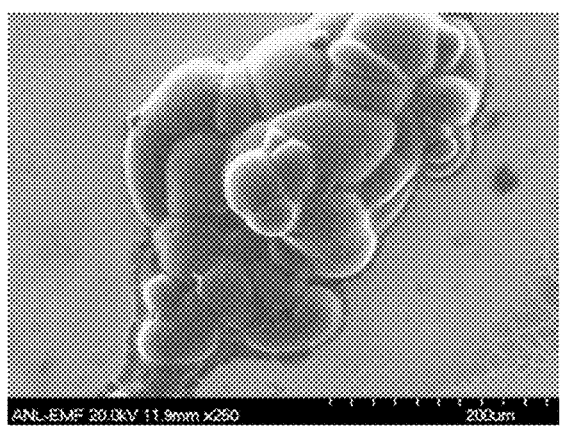
Figure 4:
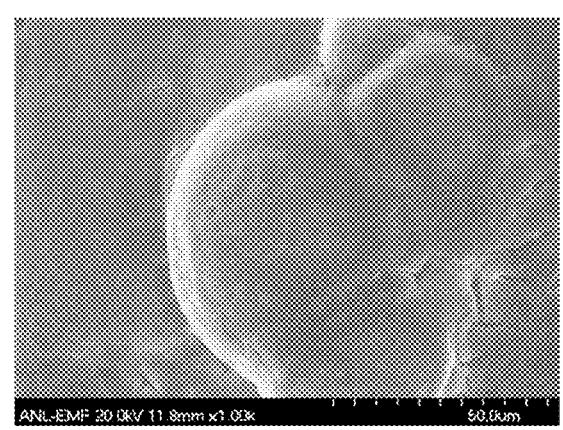

FIG. 4 shows a scanning electron micrograph (SEM) of Mg deposits on Pt from galvanostatic deposition of $Mg(AlPFTB_4)_2$ in triglyme for 2.5 h at a current density of 1.5 $mA/cm^2$; WE: Pt; CE: Mg; reference electrode: Ag/AgCl; Panel A shows 239×magnification for deposits from 0.1 M solution. Panel B shows 1000×magnification for deposits from 0.1 M solution. Panel C shows 250×magnification for deposits from 0.4 M solution. Panel D shows 1000×magnification for deposits from 0.4 M solution. Images of the deposits obtained from the 0.1 M solution via scanning electron microscopy (SEM) show randomly dispersed globular islands (FIG. 4, Panel A), which were composed of densely packed, crystalline platelets of 20×100 μm in size (FIG. 4, Panel B). The morphology of these deposits is different from the commonly observed smooth and continuous film, but this morphology is not unprecedented. Prior XRD, SEM and STM studies on Mg deposition from solutions of $R_{2-m}MgCl_m$ (R=Et, Bu; m=0, 1) and $R'_{3-n}AlCl_n$ in ethereal solvents (R'=Me, Et; n=1, 2) suggest that nucleation of $Mg^0$ starts randomly with similar island formation as observed here according to a local concentration gradient of active species. The nucleation process is strongly dependent on the applied current density as a result of competitive kinetics between charge transfer and mass transfer, as well as the structure of adsorbed $Mg^{2-}$ species. Interestingly, SEM images of the deposits obtained from the 0.4 M solution show similar globular macrostructures (FIG. 4, Panel C); however, these aggregates were highly amorphous (FIG. 4, Panel D).

Figure 5:
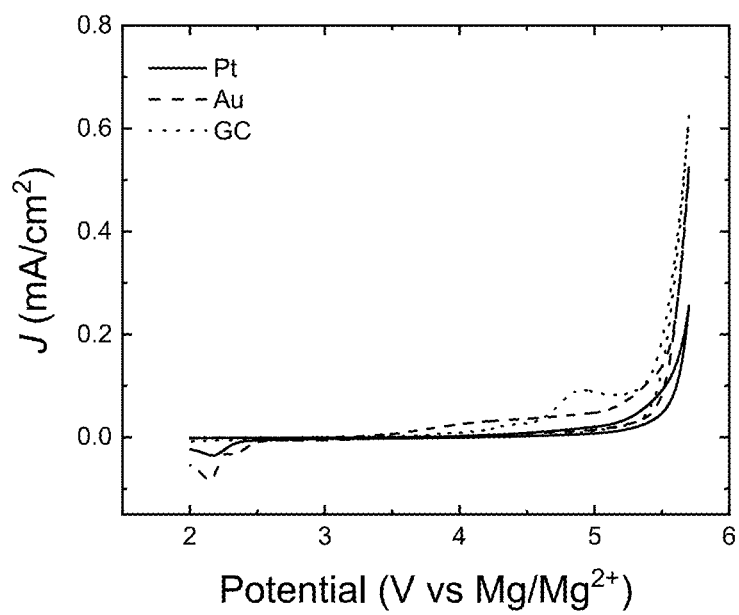
FIG. 5 provides plots of current density (J, mA/cm$^2$) versus voltage (V) for 0.1 M solution of Mg(AlPFTB$_4$)$_2$ in 3-methylsulfolane, demonstrating anodic stability of Mg(AlPFTB$_4$)$_2$ versus different current collectors: platinum (Pt: solid), gold (Au: dash), glassy carbon (GC: dot), molybdenum (Mo: dash-dot-dot), stainless steel (SS: dash-dot), aluminum (Al: short dot); working electrode (WE): Pt, Au, Mo, SS, Al, GC; counter electrode (CE): Mg; reference electrode: Ag/AgCl; 5 mV/s (Mo, SS, Al) or 20 mV/s (Pt, Au, GC). Panel A shows plots with Pt, Au and GC as WE. Panel B shows plots with Mo, SS and Al as WE.
Figure 5:
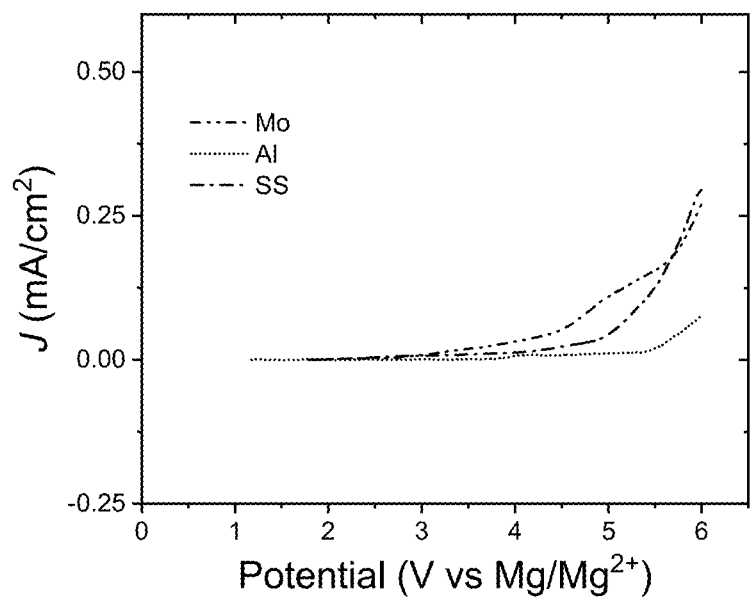

Elemental mapping for Al, F, and Mg was performed using Energy-dispersive X-ray spectroscopy (EDS) on the crystalline aggregates from the 0.1 M solution. Mg was the sole element detected in the deposit (no Al, C or F atoms were detected). These results are consistent with CV data that Mg could be electrodeposited from $Mg(AlPFTB_4)_2$ in triglyme, and minimal decomposition of the $[TPFA]^-$ anion on Mg surface during constant-current electrodeposition at the concentration of 0.1 M. EDS analysis of the deposits from the 0.4 M solution still shows Mg as the major element; however, the deposits also contained significant amounts of C and F atoms and to a lesser extent Al atoms, which is indicative of increased decomposition of the $[AlPFTB_4]^-$ anion. These results strongly suggest that galvanostatic deposition of Mg in a more concentrated solution of $Mg(AlPFTB_4)_2$ leads to electrodeposition of Mg that was accompanied by increased decomposition of $[AlPFTB_4]^-$ anion to form the observed amorphous mixtures. These comparative SEM/EDS results are also consistent with CV results, where a lower initial coulombic efficiency of Mg deposition/dissolution in the 0.4 M solution was observed. Together with CV studies, these results strongly indicate that at 0.4 M, where ion-pairs are formed, increased reductive decomposition occurred relative to 0.1 M where little coordination of $[AlPFTB_4]^-$ to $Mg^{2+}$ was present FIG. 5 provides plots of current density (J, $mA/cm^2$) versus voltage (V) for 0.1 M solution of $Mg(AlPFTB_4)_2$ in 3-methylsulfolane, demonstrating anodic stability of $Mg(AlPFTB_4)_2$ versus different current collectors: platinum (Pt: solid), gold (Au: dash), glassy carbon (GC: dot), molybdenum (Mo: dash-dot-dot), stainless steel (SS: dash-dot), and aluminum (Al: short dot).; working electrode (WE): Pt, Au, Mo, SS, Al, GC; counter electrode (CE): Mg; reference electrode: Ag/AgCl; 5 mV/s (Mo, SS, Al) or 20 mV/s (Pt, Au, GC). Panel A shows plots with Pt, Au and GC as WE. Panel B shows plots with Mo, SS and Al as WE. In order to gauge the anodic stability of $Mg(AlPFTB_4)_2$, the compound was dissolved in 3-methylsulfolane and residual THF was removed under vacuum at 55° C. overnight. $^1H$ NMR and GC-MS of the solution indicate removal of THF to an undetectable level.

The anodic stability of a 0.1 M solution of $Mg(AlPFTB_4)_2$ in 3-methylsulfolane was investigated by CV using glassy carbon (GC), Au, and Pt electrodes. The electrodes were immersed in the solution at 2.0 V (0 V vs reference electrode) and cycled between 2.0 and 5.7 V at a rate of 20 mV/s for 3 consecutive cycles (FIG. 5, Panel A). Broadly speaking, bulk oxidation occurred at potentials above 5.4 V on all three electrode materials (defined as $J>0.1$ $mA/cm^2$). Similarly, bulk oxidation >5 V was also observed for Al and stainless steel electrodes when these were immersed at their open-circuit potential (FIG. 5, Panel B). These results suggest high thermodynamic stability of in 3-methylsulfolane.

Figure 6:
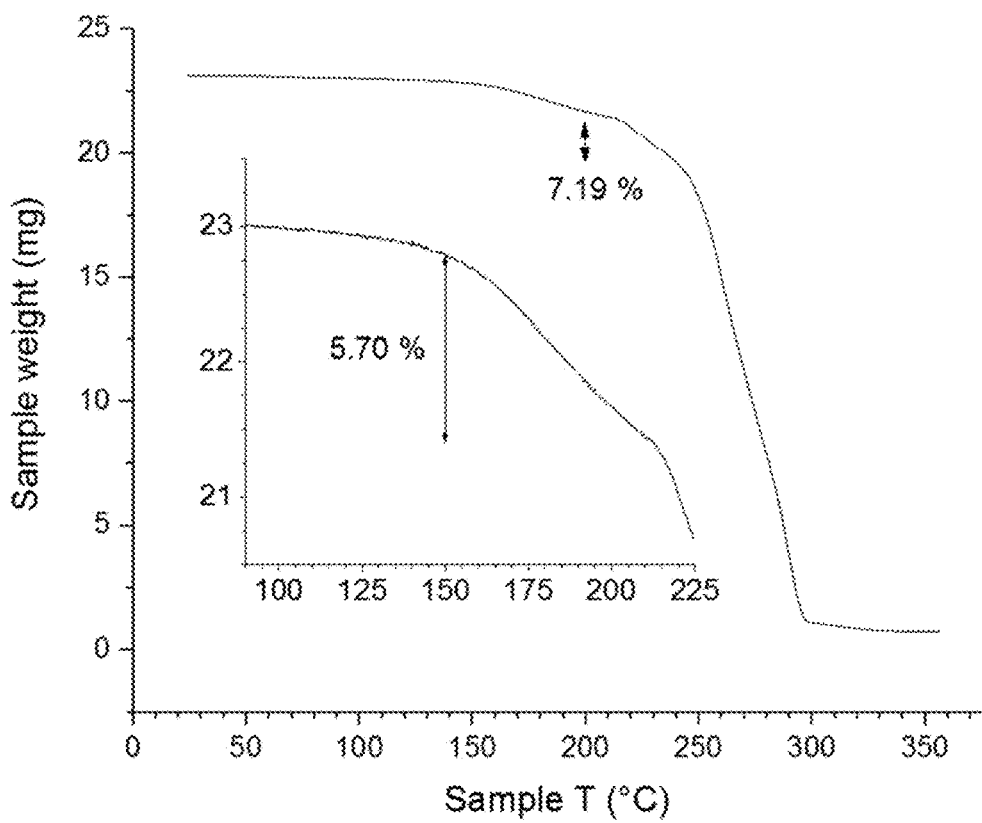
FIG. 6 provides plots of sample weight versus temperature for Mg(THF)$_7$(AlPFTB$_4$)$_2$, demonstrating thermal stability up to about 240° C.

The thermal stability of $Mg(AlPFTB_4)_2$ was investigated by thermogravimetric analysis (TGA). FIG. 6 provides plots of sample weight versus temperature for $Mg(THF)_7$ $(AlPFTB_4)_2$, demonstrating thermal stability up to about 240° C. The analysis shows that the compound is stable until 150° C., after which the sample lost 5.7% of its weight (1.38 mg) from 150 and 210° C., and 7.19% (1.74 mg) from 210 to 240° C. Above 240° C., almost the entire mass was rapidly lost presumably via sublimation. While little is known about the possible chemical changes during sublimation, these results show that the compound was stable up to 240° C. without sublimation.

Figure 7:
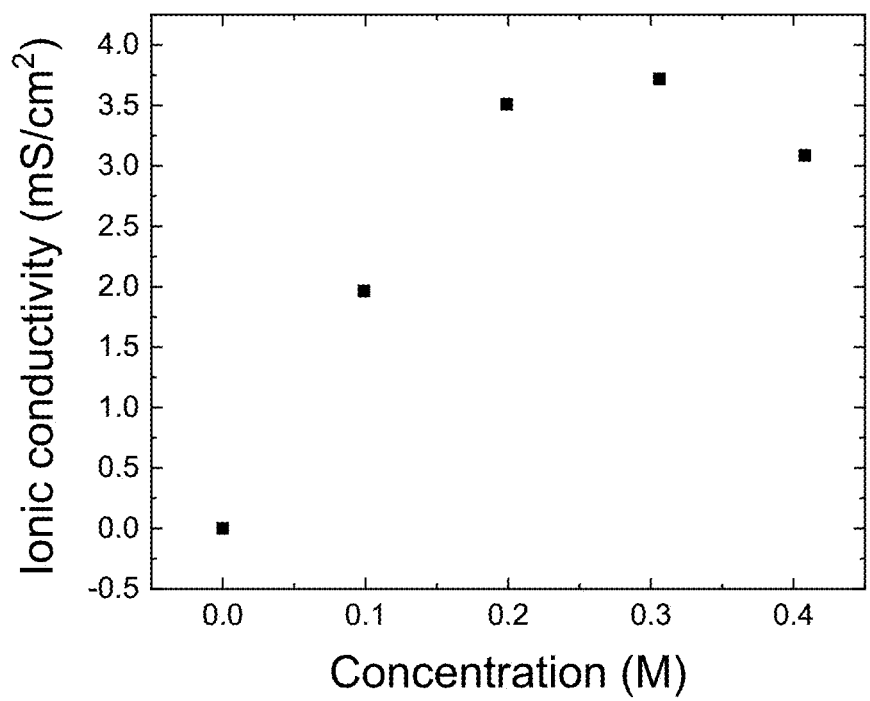
FIG. 7 shows a plot of ionic conductivity versus concentration for Mg(AlPFTB$_4$)$_2$ in triglyme solvent. Ionic conductivities of solutions of Mg(AlPFTB$_4$)$_2$ in triglyme at various concentration were calculated from impedance values that were measured with AC impedance spectroscopy.

Ionic conductivities of solutions of $Mg(AlPFTB_4)_2$ in triglyme at various concentration were calculated from impedance values that were measured with AC impedance spectroscopy. FIG. 7 shows a plot of ionic conductivity versus concentration for $Mg(AlPFTB_4)_2$ in triglyme solvent. This analysis shows that the ionic conductivity initially increases with concentration, peaks at about 0.3 M, and then decreases thereafter. The maximum solubility of the compound in triglyme is 0.4 M. These results suggest that ion association occurs at concentration above 0.2 M in triglyme, which reduces the amount of free ions in the solution.

EXAMPLE 3

Exemplary Electrochemical Cell and Battery

Figure 8:
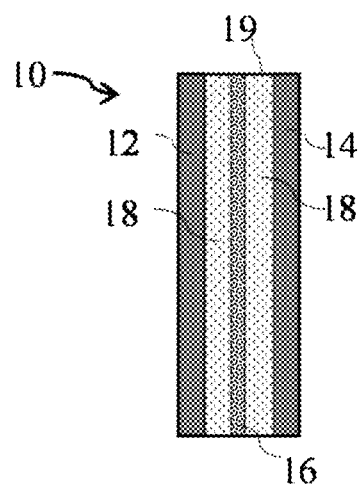
FIG. 8 schematically illustrates an electrochemical cell.
Figure 9:
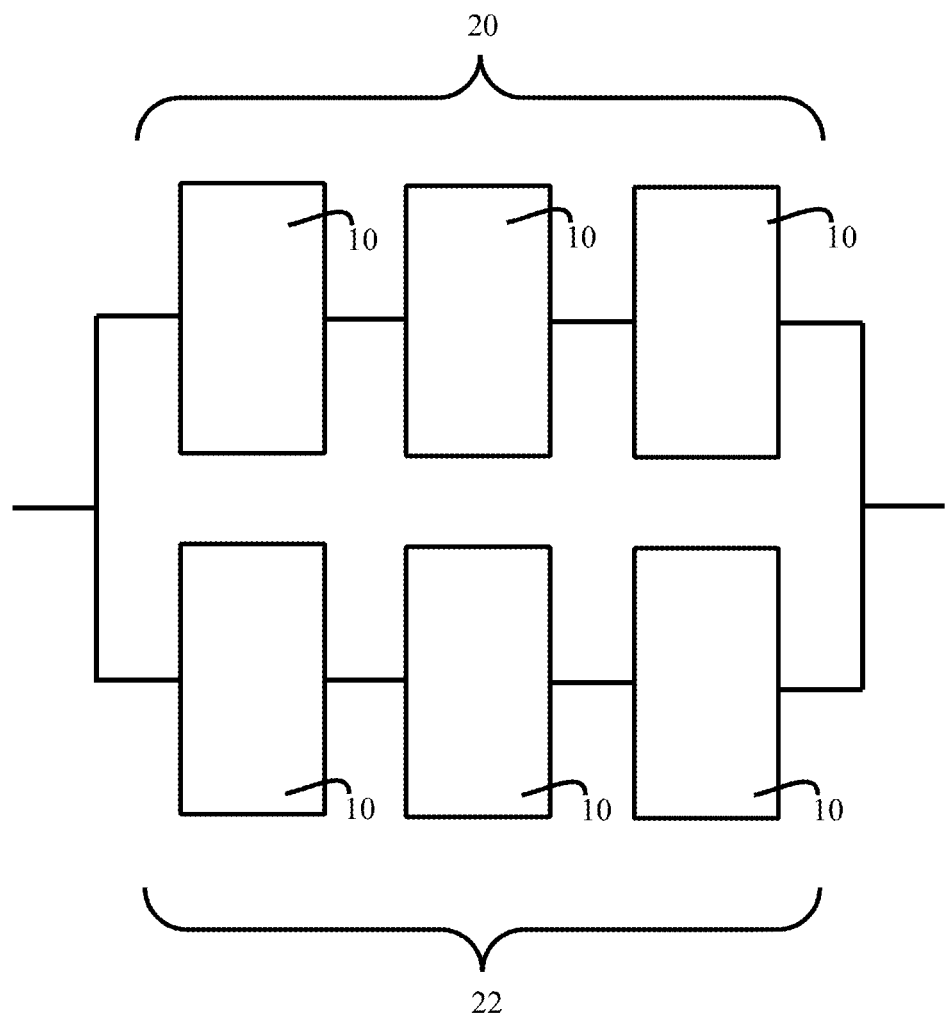
FIG. 9 schematically illustrates a battery comprising a plurality of an electrochemical cells electrically connected together.

FIG. 8 schematically illustrates a cross-sectional view of Mg-ion electrochemical cell 10 comprising cathode 12 (e.g., comprising metallic or carbon current collector coated with a material capable of reversibly accepting and releasing magnesium ions), and anode 14 (e.g., Mg), with a porous separator 16 (e.g., a polypropylene microporous separator, a polyethylene/polypropylene/polyethylene microporous separator, a polyethylene microporous separator; a poly(vinylidene-difluoride)-polyacrylonitrile graft copolymer microporous separator; and the like) between cathode 12 and anode 14. Electrolyte 18, comprising a solution of a Mg salt described herein in a non-aqueous solvent contacts electrodes 12 and 14 and separator 16. Optionally, the cathode can comprise a particulate carbon material (e.g., graphite or carbon black) intermixed with the material capable of reversibly accepting and releasing magnesium ions in a binder compound, such as poly(vinylidene difluoride). The electrodes, separator and electrolyte are sealed within housing 19. FIG. 9 schematically illustrates a magnesium-ion battery comprising a first array 20 consisting of three series-connected electrochemical cells 10, and a second array 22 consisting of three series-connected electrochemical cells 10, in which first array 20 is electrically connected to second array 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. An electrochemical cell comprising
an anode;
a cathode;
and a magnesium ion-containing electrolyte contacting the anode and the cathode; wherein the anode comprises metallic magnesium and the cathode comprises at least one compound selected from the group consisting of $MoS_2$, $Mo_6S_8$, $MoO_3$, $TiS_2$, $Ti_2S_4$, $V_2O_5$, $MnO_2$, $MgM^a_2O_4$, $MgM^bXO_4$, $Mg_{0.5}M^c_2(PO_4)_3$, and $Mg_xM^d(CN)_6 \cdot yH_2O$; wherein:

$M^a$ is one or more metal selected from the group consisting of Mn, Fe, Co, Ni, and Cr;

$M^b$ is one or more metal selected from the group consisting of Fe, Mn, Co, and Ni;

$M^c$ is one or more metal selected from the group consisting of Ti, Zr, V, and Fe;

$M^d$ is one or more metal selected from the group consisting of Fe and Ni;

X is one or more element selected from the group consisting of Si, P, and S;

x is 0 or 1; and y is in the range of 0 to 9;

the electrolyte comprises a magnesium salt dissolved in a nonaqueous solvent;

the magnesium salt comprises a salt of Formula (I):
$Mg(Z)_n^{2+}[M(OCR_3)_4^-]_2$;

Z is an ether;

n is 0 to 7;

M is Al or B; and each R independently is a perfluoroalkyl group.

2. A battery comprising a plurality of the electrochemical cell of claim 1 electrically connected together.

3. The electrochemical cell of claim 1, wherein Z comprises at least one ether selected from the group consisting of a dialkyl ether and a cyclic ether.

4. The electrochemical cell of claim 1, wherein Z comprises at least one ether selected from the group consisting of diethyl ether and tetrahydrofuran.

5. The electrochemical cell of claim 1, wherein n is 7.

6. The electrochemical cell of claim 1, wherein M is Al.

7. The electrochemical cell of claim 1, wherein M is B.

8. The electrochemical cell of claim 1, wherein each R independently is a $C_1$ to $C_{10}$ perfluoroalkyl.

9. The electrochemical cell of claim 1, wherein each R is trifluoromethyl.

10. The electrochemical cell of claim 1, wherein M is Al, and each R is trifluoromethyl.

11. The electrochemical cell of claim 1, wherein M is Al, each R is trifluoromethyl, and Z is selected from the group consisting of diethyl ether and tetrahydrofuran.

12. The electrochemical cell of claim 1, wherein M is Al, each R is trifluoromethyl, Z is tetrahydrofuran, and n is 7.

13. The electrochemical cell of claim 1, wherein the nonaqueous organic solvent comprises at least one solvent selected from the group consisting of diethyl ether, tetrahydrofuran, 2-methyltetrahydrofuran, 2,5-dimethyltetrahydrofuran, dimethoxyethane, diglyme, triglyme, tetraglyme, sulfolane, 3-methylsulfolane, acetonitrile, propylene carbonate, butyrolactone, valerolactone, and glutaronitrile.

* * * * *